United States Patent Office 2,885,417
Patented May 5, 1959

2,885,417

ORGANIC COMPLEX SALTS OF POLYVALENT METALS AND METHODS OF PRODUCING THE SAME

Rudi Heyden, Dusseldorf, Germany, assignor to Bohme Fettchemie G.m.b.H., Dusseldorf, Germany, a corporation of Germany No Drawing. Application November 8, 1956
Serial No. 621,008

Claims priority, application Germany November 10, 1955

17 Claims. (Cl. 260—429.7)

This invention relates to organic complex salts of polyvalent metals and to methods of producing these complex salts from basic salts of the metals and acid phosphoric acid esters of high-molecular hydroxy-compounds.

I have found that organic complex compounds which are alcohol-soluble or alcohol- and water-soluble may be obtained by reacting acid phosphoric acid esters of high-molecular hydroxyl-compounds with a solution of basic salts of polyvalent metals in low-molecular monohydroxy alcohols. The resulting complex salts are thereby obtained in the form of a solution thereof in the monohydroxy low-molecular alcohol, but they may readily be isolated therefrom by removal of the alcohol, for example by distillation or evaporation.

The novel organic complex salts obtained in accordance with the present invention are useful, either as such or in the form of solutions, for the production of water-repellent protective coatings on various types of surfaces, for example on wood, synthetics, ceramics, metals, and the like.

Basic salts of polyvalent metals suitable for the process according to the present invention are primarily the basic salts of aluminum, chromium, iron, zirconium, titanium, tin and mercury. The acid radicals of these salts may be of varying nature, but the choice of acid radicals should always meet the requirement that the basic salt formed therewith be soluble in the alcohol used as the reaction solvent. Specific examples of operative basic salts of polyvalent metals are basic chromium chlorides, basic aluminum nitrates, basic iron chlorides, and the like.

Suitable phosphoric acid esters of high-molecular hydroxyl-compounds for the process according to the present invention are primarily acid esters of orthophosphoric acid formed with high-molecular alcohols of the aliphatic, cyclo-aliphatic, aliphatic-aromatic or cycloaliphatic-aromatic series. More specifically, such phosphoric acid esters as monooctylphosphate, dioctylphosphate, monolaurylphosphate, dilaurylphosphate, monooleylphosphate, dioleylphosphate, monocyclohexylphosphate, dicyclohexylphosphate, mononaphthenylphosphate, dinaphthenylphosphate, mono- and dialkylphenylphosphates with alkyl radicals having from 3 to 18 carbon atoms, and the like, are among those phosphoric acid esters which may be used as one starting component in the present process.

The most simple method of producing such acid phosphoric acid esters is by reaction of phosphorus pentoxide with the corresponding alcohol. In addition to other esterification products, this reaction produces mainly monoesters of phosphoric acid. The phosphoric acid ester mixtures thus obtained may be used without further purification or separation treatment for the reaction in accordance with the present invention; that is, for the reaction with the basic salts of polyvalent metals, such as basic chromium or aluminum salts.

The acid phosphoric acid esters may, however, also be produced in accordance with other known methods; for example, by reacting the alcohols with phosphorus oxychloride.

Low-molecular monohydroxy alcohols which may be used as solvents in the process for the formation of organic complex salts according to my invention include, for example, tetrahydrofurfuryl alcohol and the lower alkanols, such as methanol, ethanol, isopropanol, butanol, and so forth.

The reaction of the basic metal salt with the acid phosphoric acid esters in the presence of monohydroxy alcohols proceeds with varying molar ratios. If basic salts of trivalent metals, such as the above-mentioned chromium or aluminum salts, are employed for the formation of the organic complex salts, the most advantageous molar ratio is 1 to 5 moles of basic metal salt per mol of phosphoric acid ester. Depending upon the particular basic metal salt used and the molar ratio of salt to ester, complex salts are obtained which are either soluble in both water and alcohol, or soluble in alcohol or other organic solvents only.

For instance, if the molar ratio of chromium salts or aluminum salts per mol of monododecylphosphate is 2.5 or less, the organic complex salts formed thereby are soluble only in organic solvents, whereas the organic complex salts formed by 3 or more mols of basic metal salt per mol of phosphoric acid ester are not only soluble in organic solvents but also in water.

The reaction between the basic metal salts in solution in low-molecular monohydroxy alcohols and the acid phosphoric acid esters is preferably carried out at elevated temperatures at atmospheric or superatmospheric pressure.

The alcohol solutions of the complex metal salts formed by the reaction according to the present invention are very stable. The complex metal compounds themselves may readily be recovered from these solutions, either by removing the solvent by distillation or by evaporating the solution to dryness. Distillation of the solvent yields the complex salts in the form of concentrates, while evaporation to dryness yields the complex salts in a solid, alcohol-soluble form.

If the alcohol solutions formed by the reaction according to the present invention are diluted with water, the resulting aqueous solutions have a cation-active character. The organic complex metal compounds may be precipitated therefrom with anion-active compounds; for example, with aqueous solutions of anionic soaps or anionic resins. Cationic soaps or resins, however, do not produce such a precipitation. It therefore follows that the acid phosphoric acid radical must be linked to the remainder of the molecule in complex fashion. The metal complex compounds may further be precipitated from the aqueous solutions with bases, oxalates, carbonates, chromates, and also with water-soluble salts of polymeric inorganic acids such as polyphosphates. The sulfates of the aluminum and chromium complex compounds are rather difficultly soluble.

The exact structure of the complex compounds obtained by the above-described reaction is not known. It is believed that the acid alkyl phosphates combine with the basic metal salts and coordinate with one or more molecules of the monohydroxyalcohols. Thus complex metal compounds are formed which contain the anions of the basic metal salts partly bound to the complex cation and partly forming the anion part. If the basic metal salts are used in a hydrate state, the water molecules are likewise coordinated totally or partly with the complex cation. The complex is probably one of the Werner type, in which one or more polyvalent metal atoms are coordinated with one acid alkyl phosphate group having one or two higher molecular alkyl radicals, Preferably because of their cationic character, the alcoholic and aqueous solutions of the organic complex metal salts are capable of forming hydrophobic layers on surfaces. When aqueous solutions of the complex salts are heated, the complex compounds undergo a transformation into a water-insoluble form. Consequently, the adherence of the water-repellent coating applied to the surface of an object may be improved by heating the object which has been coated with an aqueous solution of the complex salts to temperatures up to about 100° C.

The following examples will further illustrate the present invention and enable others skilled in the art to understand it more completely. It is not intended, however, to limit the invention to these particular examples.

EXAMPLE I

*Production of 66% basic chromium chloride solution*

66.5 parts by weight chromium (III) chloride hexahydrate were boiled with 485 parts by weight methanol and 20 parts by weight sodium hydroxide for 1–2 hours under reflux accompanied by stirring. At the end of this period 29.2 parts by weight sodium chloride had separated out, which were filtered off.

*Production of the complex salt*

270 parts by weight of the 66% basic chromium (III) chloride solution thus obtained were admixed with a solution of 10 parts by weight monotetradecyl phosphoric acid ester in 70 parts by weight methanol, and the mixture was boiled for 1–2 hours under reflux. At the end of this period the reaction mixture was completely soluble in water. The complex salt consisting of about 1 mol monotetradecyl phosphoric acid ester and 3.7 mols of chromium salt was separated in the form of a concentrate containing 7.81% Cr, 5.25% Cl, and 1.25% P corresponding to 11.85% alkyl phosphoric acid ester by distilling off a portion of the methanol solvent.

EXAMPLE II 133 parts by weight chromium (III) chloride were boiled with 800 parts by weight methanol and 20 parts by weight sodium hydroxide for 1–2 hours under reflux accompanied by stirring. Without separating the sodium chloride formed thereby, the 33% basic chromium chloride solution thus obtained was then admixed with 48.5 parts by weight of a technical alkyl phosphoric acid ester mixture comprising alkyl radicals with 12–18 carbon atoms dissolved in 200 parts by weight methanol, by adding the methanol solution to the chromium chloride solution dropwise. The alkyl phosphoric acid ester mixture was obtained by reacting a coconut fatty alcohol fraction having 12–18 carbon atoms in the alkyl chain with phosphorus pentoxide. The mixture was heated for an additional 1–2 hours accompanied by stirring. Thereafter, a portion of the methanol was distilled off, yielding a concentrated solution of a complex salt, containing 1 mol of the alkyl phosphoric acid ester and 3 mols of the basic chromium salt.

The concentrate was freed from precipitated sodium chloride by filtration. The methanol solution of the complex salt was miscible with water in any desired ratio and formed a clear solution. The chromium complex salt was precipitated from the aqueous solution with hydroxyl-, sulfate-, sulfite-, phosphate- or oxalate-chromium anions as well as ferri- and ferrocyanide and hexametaphosphate.

EXAMPLE III

*Production of 33% basic aluminum chloride solution*

181.2 parts by weight aluminum chloride hexahydrate were boiled with 1200 parts by weight methanol and 30 parts by weight sodium hydroxide for about 1–2 hours under reflux accompanied by stirring. At the end of this period the theoretical amount of sodium chloride (44 parts by weight) separated out and was filtered off.

*Production of the complex salt*

182 parts by weight of the basic aluminum chloride solution thus obtained were slowly admixed with a boiling solution of 35.5 parts by weight of a phosphoric acid alkyl ester mixture in 200 parts by weight methanol; the phosphoric acid alkyl ester mixture was obtained by esterifying phosphorus pentoxide with a fatty alcohol mixture with carbon chains comprising 12–18 carbon atoms. Upon each addition of a small portion of the phosphoric acid ester solution, a slight cloudiness formed which immediately disappeared again. After the entire amount of the phosphoric acid ester solution was added, the mixture was boiled under reflux for an additional 1–2 hours. The solution thus obtained was not miscible with water. After distilling off the methanol, a colorless, dry metal complex compound containing 11.42%, Al, 30.01% Cl, and 1.68% P corresponding to 15.05% alkyl phosphoric acid ester was obtained. The complex compound was soluble in alcohols, aromatic hydrocarbons such as benzene, toluene, xylene and tetrahydronaphthalene, and in other organic solvents.

EXAMPLE IV

*Production of 66% basic aluminum chloride solution*

241 parts by weight aluminum chloride hexahydrate were boiled with 1600 parts by weight methanol and 80 parts by weight powdered sodium hydroxide under reflux for about 1–2 hours accompanied by stirring. At the end of this period approximately 105 parts by weight sodium chloride separated out, which were filtered off. The same result was obtained when 375 parts by weight aluminum nitrate nonahydrate were substituted for the aluminum chloride hexahydrate.

*Production of the complex salt*

180 parts by weight of the basic aluminum chloride solution thus obtained were slowly added to a boiling solution of 6.8 parts by weight of a phosphoric acid monoester with a fatty alcohol fraction having 12–18 carbon atoms dissolved in 50 parts by weight methanol; the phosphoric acid monoester was produced by hydrogenation of coconut fatty acid. The resulting mixture was then boiled under reflux for an additional 1–2 hours. At the end of this time it was miscible with water in any desired ratio. The same results were obtained when ethanol was substituted for methanol. After evaporating the methanol to dryness, a colorless organic aluminum complex salt remained behind which was not soluble in water but freely soluble in various organic solvents, such as methanol and other lower alkyl alcohols. Upon dissolution of the complex salt in methanol, the resulting solution was miscible with water in any desired ratio. The solution contained 1.19% Al, 1.54% Cl, and 0.32% P corresponding to 3.35% alkyl phosphoric acid ester.

EXAMPLE V

*Production of a 75% basic aluminum chloride solution*

241 parts aluminum chloride hexahydrate were dissolved in 1600 parts by weight methanol, and the solution was admixed with 90 parts by weight sodium hydroxide. The resulting mixture was boiled under reflux for 1–2 hours, at the end of which time the entire theoretical amount of sodium chloride had separated out. The sodium chloride was filtered off.

*Production of the complex salt*

170 parts by weight of the basic aluminum chloride solution obtained above were admixed with a solution of 9.1 parts by weight of the monophosphoric acid ester of coconut fatty alcohols having from 12–18 carbon atoms dissolved in 60 parts by weight methanol, and the resulting mixture was boiled under reflux for 1–2 hours. A water-miscible product was obtained which contained as its principal constituent a complex salt. The resulting solution contained 1.14% Al, 1.1% Cl and 0.42% P corresponding to 3.83% alkyl phosphoric acid ester.

EXAMPLE VI 27 parts by weight ferric chloride hexahydrate were dissolved in 125 parts by weight methanol, and the solution was admixed with a solution of 24.1 parts by weight sodium hydroxide in 25 parts by weight methanol. The resulting mixture was heated for 4 hours under reflux accompanied by stirring. A dark-brown solution containing approximately 20% basic ferric chloride was obtained. Without filtering off the sodium chloride precipitated during the above reaction, the solution was admixed with a solution of 6.8 parts by weight monododecyl phosphoric acid ester in methanol, and the mixture was heated. The formation of a precipitate was observed, but this precipitate slowly dissolved again. At the same time the color of the solution lightened and at the end of the reaction it was light amber. Thereafter the solution was filtered and the filtrate was found to be a solution of an iron complex salt. The complex salt was readily soluble in organic solvents but only moderately soluble in water.

EXAMPLE VII 19.5 parts by weight monooctylphenyl phosphate, produced from technical grade octylphenol and phosphorus oxychloride with subsequent saponification of the acid ester, were admixed with 375 parts by weight of a methanolic solution containing 28 parts by weight of 33% basic chromium chloride, and the mixture was heated for a total of 1–2 hours under reflux at the boiling point. A clear solution was obtained which was readily miscible with warm water. The principal constituent of this solution was a complex chromium salt.

Substantially the same results were obtained when octylcyclohexanol was substituted for the octylphenol in the formation of the chromium chloride solution and when 20 parts by weight of monooctylcyclohexyl phosphate were substituted for the monooctylphenyl phosphate. The complex salt solution used in this manner was also readily miscible with warm water.

EXAMPLE VIII 38 parts by weight titanium tetrachloride were dissolved in 100 parts by weight ethanol while cooling. The resulting solution was diluted with 100 parts by weight methanol. The mixture thus obtained was heated to the boiling point and at that temperature was admixed with a solution of 16 parts by weight sodium hydroxide in 100 parts by weight methanol accompanied by stirring. After heating the mixture for about 5 hours, the sodium chloride precipitated thereby was filtered off. 152 parts by weight of this solution, containing about 50% basic titanium chloride, were then admixed with a boiling solution of 6.8 parts by weight of the monoalkyl phosphoric acid ester described in Example II in 50 parts by weight methanol. The precipitate which formed at first again dissolved after a short period of time. In all, the resulting mixture was heated for 10 hours at the boiling point accompanied by stirring. At the end of this period the small amount of precipitate remaining was filtered off. The solution thus obtained contained as its principal constituent a complex titanium salt.

Upon dilution of this solution with a large amount of water, an opalescent solution was formed, whereas dilution with a relatively small amount of water produced a milky dispersion which was stable for long periods of time.

EXAMPLE IX 40 parts by weight aluminum isopropylate were dissolved in 100 parts by weight isopropanol accompanied by heating. Thereafter, a mixture of 20 parts by weight concentrated hydrochloric acid (specific weight 1.18) and 20 parts by weight isopropanol was added dropwise to the warm solution accompanied by stirring, and the resulting mixture was heated for 2 hours under reflux. A solution of 13.5 parts by weight of the phosphoric acid ester mixture described in Example IV in 30 parts by weight isopropanol was added over a period of ½ hour to the 66% basic aluminum chloride solution in isopropanol, produced in accordance with the method described above, and the mixture was heated for an additional three hours. The product was an approximately 15% solution of the complex salt described in Example IV.

EXAMPLE X

A solution of 8.3 parts by weight monocetyl phosphoric acid ester in methanol was added to a solution of 9.65 parts by weight of the 66% basic aluminum chloride obtained as described in Example IV in 170 parts by weight methanol, and the mixture was heated at the boiling point for 2–3 hours. A virtually clear solution of an aluminum complex salt containing 1.08% Al, 1.41% Cl and 0.32% P corresponding to 3.35% acid alkyl phosphoric acid ester was obtained, which was readily miscible with any desired quantity of water.

EXAMPLE XI 24 parts by weight aluminum chloride hexahydrate ($AlCl_3 \cdot 6H_2O$) were dissolved in 100 parts by weight 1,2-propylene glycol, and the solution was admixed with 8 parts by weight powdered sodium hydroxide. The resulting mixture was heated for 5 hours at 80–85° C. accompanied by stirring. Without separating the sodium chloride precipitated thereby, a solution of 6.65 parts by weight monododecyl phosphoric acid ester in 50 parts by weight 1,2-propylene glycol was slowly added to the above aluminum chloride solution, and the resulting mixture was heated for an additional 2–3 hours. During the addition of the phosphoric acid ester, a negligible amount of a precipitate was formed which again dissolved after a short period of time. The sodium chloride was then filtered off. The filtrate thus obtained was a clear solution of an aluminum complex salt which was readily miscible with water in any desired ratio.

EXAMPLE XII

Starting from a solution of tin tetrachloride in methanol, a solution of 112 parts by weight of 50% basic tin (IV) chloride in 150 parts by weight methanol was produced by adding the corresponding amount of sodium hydroxide. 3.4 parts by weight of a monoalkyl phosphoric acid ester mixture comprising alkyl radicals with 12–18 carbon atoms dissolved in 30 parts by weight methanol were added to this solution accompanied by stirring. Thereafter, the resulting mixture was heated at the boiling point for about 10 hours. The reaction product was a solution of a complex tin salt, which produced a slightly opalescent solution upon dilution with water.

EXAMPLE XIII 133 parts by weight chromium chloride hexahydrate were dissolved in 400 parts by weight tetrahydrofurfuryl alcohol, and 20 parts by weight finely pulverized sodium hydroxide were added to this solution at 100° C. accompanied by stirring. Without separating the sodium chloride precipitated thereby, 48.5 parts by weight of the monotetradecyl phosphoric acid ester dissolved in 100 parts by weight tetrahydrofurfuryl alcohol were added thereto, and the resulting mixture was heated for about 1 hour. The resulting solution was then filtered. The filtrate was a solution of a chromium complex salt which was readily miscible with water in any desired ratio.

EXAMPLE XIV

A solution of 140 parts by weight of 33% basic chromium chloride in 1750 parts by weight methanol, produced in accordance with the procedure described in Example I, was admixed at the boiling point with a solution of 144 parts by weight didodecylphosphate in 2000 parts by weight methanol, and the resulting mixture was heated at the boiling point for about 2 hours. At the end of this period a clear solution was formed which contained as its principal constituent a chromium complex salt containing 1 mol of the didodecyl phosphate and 3 mols of the basic chromium chloride, which was readily miscible with water.

EXAMPLE XV 27.7 parts by weight of chromic acid anhydride were dissolved in 80.4 parts by weight water, and 61.15 parts by weight of a 31.5% hydrochloric acid solution were added thereto. The resulting mixture was then added to boiling isopropanol accompanied by stirring. Acetone was formed by oxidation, which was distilled off in a fractionating column. Thereafter, the remaining reaction mixture was admixed with a solution of 26.8 parts by weight of a monoalkyl phosphate (alkyl radicals having 12–18 carbon atoms) in 100 parts by weight isopropanol, and the mixture was heated under reflux for about 1–2 hours. The resulting solution of a chromium complex salt was miscible with water in any desired ratio and behaved chemically substantially identically to the complex salt solution produced in Example II.

EXAMPLE XVI 10 parts by weight sodium hydroxide and 64.3 parts by weight chromium chloride hexahydrate were heated with 150 parts methanol for 10 minutes under reflux. At the end of this time partially precipitated chromium hydroxide and, in some instances, higher basic salts redissolved, and 33.3% basic chromium chloride was formed. 24.3 parts by weight of a monoalkyl phosphoric acid ester mixture containing alkyl radicals with from 12–18 carbon atoms dissolved in 70 parts by weight methanol were added to this solution within a period of 10 minutes accompanied by vigorous stirring. The resulting mixture was heated at the boiling point under reflux for an additional 10 minutes. After filtering the resulting solution a clear solution of a complex chromium salt was obtained; this solution was concentrated by distilling off the methanol solvent.

In place of the monoalkyl phosphoric acid ester mixture with alkyl radicals containing from 12–18 carbon atoms, the corresponding phosphoric acid esters with unsaturated alkenyl radicals having from 14–18 carbon atoms may be used. Similarly, monophosphoric acid esters of alcohols or alcohol mixtures which have been obtained by reduction of naphthenic acids or naturally occurring resin acids may be substituted for the monoalkyl phosphoric acid ester mixture used in the above example.

While I have illustrated the present invention with the aid of certain specific embodiments thereof, it will be apparent to persons skilled in the art that the present invention is not limited to those embodiments and that various changes and modifications may be made without departing from the spirit of the invention or the scope of the appended claims.

I claim:

1. A process for the production of water-miscible, organic, complex salts of polyvalent metals which comprises reacting without addition of water at reflux temperatures in the ratio of at least 2.5 mols of an alcohol-soluble, basic salt of a polyvalent metal selected from the group consisting of aluminum, chromium, iron, mercury, tin, titanium and zirconium dissolved in an excess of an alcohol selected from the group consisting of lower alkanols, tetrahydrofurfuryl alcohol and 1,2 propylene glycol to one mol of an acid ester of phosphoric acid esterified with an alcohol selected from the group consisting of alkanols, alkenols, cycloalkanols, alkylphenols and alkylcycloalkanols, said alcohol having about 6 to about 18 carbon atoms in the molecule.

2. Process of claim 1 wherein said reaction is carried out in the presence of an excess of methanol as the solvent.

3. A process for the production of water-miscible, organic, complex salts of polyvalent metals which comprises reacting without addition of water at reflux temperatures in the ratio of about 3 mols to about 5 mols of an alcohol-soluble, basic salt of a polyvalent metal selected from the group consisting of aluminum, chromium, iron, mercury, tin, titanium and zirconium dissolved in an excess of an alcohol selected from the group consisting of lower alkanols, tetrahydrofurfuryl alcohol and 1,2 propylene glycol to one mol of an acid ester of phosphoric acid esterified with an alcohol selected from the group consisting of alkanols, alkenols, cycloalkanols, alkylphenols and alkylcycloalkanols, said alcohol having about 6 to about 18 carbon atoms in the molecule.

4. A process for the production of a concentrated, water-miscible, alcohol solution of organic complex salts of polyvalent metals which comprises reacting without addition of water at reflux temperatures in the ratio of about 3 mols to about 5 mols of an alcohol-soluble, basic salt of a polyvalent metal selected from the group consisting of aluminum, chromium, iron, mercury, tin, titanium and zirconium dissolved in an excess of an alcohol selected from the group consisting of lower alkanols, tetrahydrofurfuryl alcohol and 1,2 propylene glycol to one mol of an acid ester of phosphoric acid esterified with an alcohol selected from the group consisting of alkanols, alkenols, cycloalkanols, alkylphenols and alkylcycloalkanols, said alcohol having about 6 to about 18 carbon atoms in the molecule and distilling the excess alcohol from the solution.

5. A process for the production of a concentrated, water-miscible, alcohol solution of organic complex salts of polyvalent metals which comprises reacting without addition of water at reflux temperatures in the ratio of about 3 mols to about 5 mols of an alcohol-soluble, basic chloride of a polyvalent metal selected from the group consisting of aluminum, chromium, iron, mercury, tin, titanium and zirconium dissolved in an excess of an alcohol selected from the group consisting of lower alkanols, tetrahydrofurfuryl alcohol and 1,2 propylene glycol to one mol of an acid ester of phosphoric acid esterified with an alcohol selected from the group consisting of alkanols, alkenols, cycloalkanols, alkylphenols and alkylcycloalkanols, said alcohol having about 6 to about 18 carbon atoms in the molecule and distilling the excess alcohol from the solution.

6. A process for the production of a concentrated, water-miscible, methanol solution of an organic-phosphate, complex salt of chromium which comprises reacting without addition of water at reflux temperatures in the ratio of about 3 mols to about 5 mols of an alcohol-soluble, basic chloride of chromium dissolved in an excess of methanol to one mol of an acid ester of phosphoric acid esterified with an alkanol having about 6 to about 18 carbon atoms in the molecule and distilling the excess methanol from the solution.

7. A process for the production of a concentrated, water-miscible, methanol solution of an organic-phosphate, complex salt of aluminum which comprises reacting without addition of water at reflux temperatures in the ratio of about 3 mols to about 5 mols of an alcohol-soluble, basic chloride of aluminum dissolved in an excess of methanol to one mol of an acid ester of phosphoric acid esterified with an alkanol having about 6 to about 18 carbon atoms in the molecule and distilling the excess methanol from the solution.

8. A water-miscible, catonic-active, organic, complex salt of a polyvalent metal containing a ratio of at least 2.5 mols of an alcohol-soluble, basic salt of a polyvalent metal selected from the group consisting of aluminum, chromium, iron, mercury, tin, titanium and zirconium, for every one mol of an acid ester of phosphoric acid esterified with an alcohol selected from the group consisting of alkanols, alkenols, cycloalkanols, alkylphenols, and alkylcycloalkanols, said alcohol having about 6 to about 18 carbon atoms in the molecule, and having coordinated with said basic salt and said acid ester a lower alcohol selected from the group consisting of lower alkanols, tetrahydrofurfuryl alcohol and 1,2 propylene glycol.

9. A water-miscible, catonic-active, organic, complex salt of a polyvalent metal containing a ratio of about 3 mols to about 5 mols of an alcohol-soluble, basic salt of a polyvalent metal selected from the group consisting of aluminum, chromium, iron, mercury, tin, titanium and zirconium, for every one mol of an acid ester of phosphoric acid esterified with an alcohol selected from the group consisting of alkanols, alkenols, cycloalkanols, alkylphenols, and alkylcycloalkanols, said alcohol having about 6 to about 18 carbon atoms in the molecule, and having coordinated with said basic salt and said acid ester a lower alcohol selected from the group consisting of lower alkanols, tetrahydrofurfuryl alcohol and 1,2 propylene glycol.

10. A water-miscible, catonic-active, organic, complex salt of a polyvalent metal containing a ratio of about 3 mols to about 5 mols of an alcohol-soluble, basic chloride of a polyvalent metal selected from the group consisting of aluminum, chromium, iron, mercury, tin, titanium and zirconium, for every one mol of an acid ester of phosphoric acid esterified with an alcohol selected from the group consisting of alkanols, alkenols, cycloalkanols, alkylphenols, and alkylcycloalkanols, said alcohol having about 6 to about 18 carbon atoms in the molecule, and having coordinated with said basic chloride salt and said acid ester a lower alcohol selected from the group consisting of lower alkanols, tetrahydrofurfuryl alcohol and 1,2 propylene glycol.

11. A water-miscible composition of a cationic-active, organic, complex salt of a polyvalent metal containing a ratio of at least 2.5 mols of an alcohol-soluble, basic salt of a polyvalent metal selected from the group consisting of aluminum, chromium, iron, mercury, tin, titanium and zirconium, for every one mol of an acid ester of phosphoric acid esterified with an alcohol selected from the group consisting of alkanols, alkenols, cycloalkanols, alkylphenols, and alkylcycloalkanols, said alcohol having about 6 to about 18 carbon atoms in the molecule, and having coordinated with said basic salt and said acid ester a lower alcohol selected from the group consisting of lower alkanols, tetrahydrofurfuryl alcohol and 1,2 propylene glycol, said complex salt in solution in an excess of said lower alcohol.

12. A water-miscible composition of a cationic-active, organic, complex salt of a polyvalent metal containing a ratio of about 3 mols to about 5 mols of an alcohol-soluble, basic salt of a polyvalent metal selected from the group consisting of aluminum, chromium, iron, mercury, tin, titanium and zirconium, for every one mol of an acid ester of phosphoric acid esterified with an alcohol selected from the group consisting of alkanols, alkenols, cycloalkanols, alkylphenols, and alkylcycloalkanols, said alcohol having about 6 to about 18 carbon atoms in the molecule, and having coordinated with said basic salt and said acid ester a lower alcohol selected from the group consisting of lower alkanols, tetrahydrofurfuryl alcohol and 1,2 propylene glycol, said complex salt in an excess of said lower alcohol.

13. A water-miscible composition of a cationic-active, organic, complex salt of a polyvalent metal containing a ratio of about 3 mols to about 5 mols of an alcohol-soluble, basic chloride of a polyvalent metal selected from the group consisting of aluminum, chromium, iron, mercury, tin, titanium and zirconium, for every one mol of an acid ester of phosphoric acid esterified with an alcohol selected from the group consisting of alkanols, alkenols, cycloalkanols, alkylphenols, and alkylcycloalkanols, said alcohol having about 6 to about 18 carbon atoms in the molecule, and having coordinated with said basic chloride salt and said acid ester a lower alcohol selected from the group consisting of lower alkanols, tetrahydrofurfuryl alcohol and 1,2 propylene glycol, said complex salt in solution in an excess of said lower alcohol.

14. A water-miscible, cationic-active, organic, complex salt containing a ratio of about 3 mols to about 5 mols of an alcohol-soluble, basic chloride of chromium for every one mol of an acid ester of phosphoric acid esterified with an alkanol having about 6 to about 18 carbon atoms, and having methanol coordinated with said basic chloride salt and said acid ester.

15. A water-miscible, cationic-active, organic, complex salt containing a ratio of about 3 mols to about 5 mols of an alcohol-soluble, basic chloride of aluminum for every one mol of an acid ester of phosphoric acid esterified with an alkanol having about 6 to about 18 carbon atoms, and having methanol coordinated with said basic chloride salt and said acid ester.

16. A water-miscible composition of a cationic-active, organic, complex salt containing a ratio of about 3 mols to about 5 mols of an alcohol-soluble, basic chloride of chromium for every one mol of an acid ester of phosphoric acid esterified with an alkanol having about 6 to about 18 carbon atoms and having methanol coordinated with said basic chloride salt and said acid ester, said complex salt in solution in an excess of methanol.

17. A water-miscible composition of a cationic-active, organic, complex salt containing a ratio of about 3 mols to about 5 mols of an alcohol-soluble, basic chloride of aluminum for every one mol of an acid ester of phosphoric acid esterified with an alkanol having about 6 to about 18 carbon atoms, and having methanol coordinated with said basic chloride salt and said acid ester, said complex salt in solution in an excess of methanol.

References Cited in the file of this patent

UNITED STATES PATENTS

| | | |
|---|---|---|
| 2,321,804 | Farrington et al. | June 15, 1943 |
| 2,329,707 | Farrington et al. | Sept. 21, 1943 |
| 2,416,985 | Farrington et al. | Mar. 4, 1947 |